United States Patent [19]
Nylund et al.

[11] Patent Number: 5,251,243
[45] Date of Patent: Oct. 5, 1993

[54] AUTOMATIC FUEL ASSEMBLY LOADER

[75] Inventors: Theodore W. Nylund; Kendell L. McDill, both of Columbia; David V. Lambert, St. Matthews, all of S.C.

[73] Assignee: Westinghouse Electric Corp., Pittsburgh, Pa.

[21] Appl. No.: 933,274

[22] Filed: Aug. 21, 1992

[51] Int. Cl.⁵ .............................................. G21C 21/00
[52] U.S. Cl. ........................................ 376/261; 29/723
[58] Field of Search ................. 376/261, 260; 29/723, 29/906; 414/146

[56] References Cited

U.S. PATENT DOCUMENTS

| | | | |
|---|---|---|---|
| 3,748,713 | 7/1973 | Tindale et al. | 376/261 |
| 4,297,776 | 11/1981 | Fogg | 376/261 |
| 4,716,018 | 12/1987 | Boatwright et al. | 376/451 |
| 4,747,997 | 5/1988 | Boatwright | 376/261 |
| 4,760,637 | 8/1988 | Kerrey et al. | 376/261 |
| 4,762,669 | 8/1988 | Doshi | 376/442 |
| 4,894,848 | 1/1990 | Lambert et al. | 376/261 |
| 4,895,698 | 1/1990 | DeMario | 376/442 |

*Primary Examiner*—Daniel D. Wasil

[57] ABSTRACT

An automated fuel assembly loader, capable of patterned loading, moves nuclear fuel rods in a loading direction between a fuel rod skeleton defining an array of receptacles for the fuel rods, and a fuel rod magazine supplying or receiving the fuel rods. A table supports the fuel rod skeleton at a loading position. A movable carriage having a line of individual fuel rod engaging devices moves a subset of fuel rods along the line forward in the loading direction. The rods are selected via a pattern stored in a controller. Selection devices such as pneumatic clamps mechanically couple the selected engaging devices to the carriage for movement while others are left behind. A ball screw carriage drive arrangement moves the carriage parallel to the loading direction and a jack screw positioning drive displaces the carriage perpendicular to the line of fuel rods. A controller is coupled to the carriage drive and to the selection devices, and stores data defining a preset pattern of receptacles in the array, operating the selection devices for actuating a group of engaging devices corresponding to the pattern. The controller also controls displacement speed, permitting patterned loading of the skeleton, for example to obtain a particular pattern of fuel rod enrichments, the controller moving line by line through an array of fuel rod receptacles in the skeleton.

17 Claims, 5 Drawing Sheets

AUTOMATIC FUEL ASSEMBLY LOADER

BACKGROUND OF THE INVENTION

1. Field of the Invention

The invention relates to the field of apparatus for loading nuclear fuel rods into skeleton assemblies, and more particularly to a loading apparatus having an array of automatically selectable pull rods which are advanced and retracted by a linear actuator for pulling selected fuel rods from a supply magazine into the skeleton. A processor controls the pull rod selection for patterned loading and/or for leaving empty thimble tube spaces in the array according to a stored pattern. The pull rods encompass a line in the array and the processor controls carriage position for advancing from line to line, and push/pull rates, for effecting programmed sequences.

2. Description of the Prior Art

Nuclear reactors of the type used to generate power by producing heat in fissile material generally have reactor cores comprising numerous fuel rods arranged in spaced-apart arrays in supporting skeletons, each of which can be handled as a unit. The skeletons have a top plate and a bottom plate known as nozzles, and a number of intermediate plates known as grids. The grids have openings through which the fuel rods extend and are held parallel to one another in a laterally spaced array whereby water or other coolant can be circulated over the fuel rods to extract heat for useful generation of power. Typically the grids form spring structures which bear inwardly on each of the rods to hold the rod securely notwithstanding the flow of coolant.

The grids and the nozzles are fixed relative to one another by thimble tubes which attach respectively to the grids and nozzles to form a structural unit for supporting the fuel rods. The thimble tubes occupy positions in the array which would otherwise have fuel rods, and form guides for control rods made of neutron absorbing material which can be inserted into the skeleton via the thimble tubes to regulate neutron flux and thereby to regulate the heat generated by the reactor core. Additionally, the skeleton typically has a further tube which carries instrumentation, and is also attached at the grids and nozzles.

Each fuel rod is a thin elongated tube which carries a stack of cylindrical fuel pellets, e.g., of uranium dioxide. The fuel rods may be, for example, 4 meters in length and only one centimeter in diameter, and thus must be supported and handled carefully to avoid damage. A rupture in a fuel rod could release radioactive fuel into the coolant. All the fuel pellets in a given fuel rod are usually of the same enrichment. However, this can be varied and the skeletons can be arranged such that the enrichment of the fuel in the rods is different for different positions in the array of rods. For example, boiling water reactors have fuel assemblies with fuel rods at different enrichments arranged in a planned pattern.

It is known to load and unload fuel rods in skeleton assemblies with the assistance of motorized means arranged to move a grasping apparatus through the fuel rod openings in skeleton grids. The fuel rods are provided with end plugs defining shapes which can be engaged or released. In U.S. Pat. No. 4,747,997—Boatwright, a fuel rod grasping apparatus is disclosed for this purpose. The grasping apparatus comprises a hollow tube terminating in an engagement fitting having a contoured shape with axial slots. A movable plug is advanced through the tube to expand the engagement fitting, thus securing the grasping apparatus in a complementary contoured shape in the end plug of a fuel rod. When the movable plug is retracted, the engagement fitting compresses resiliently and releases the fuel rod. The grasping apparatus can be coupled to actuators for advancing or retracting the rods from the skeleton assembly.

For loading a skeleton with fuel rods, the grasping apparatus is advanced through the supporting grids of the skeleton, engaged with a fuel rod in a magazine, then retracted to pull the fuel rod into position in the skeleton. The grasping apparatus must overcome the frictional engagement of the spring structures of the grids against the fuel rod while the rod is pulled into position.

In the reactor core the fuel rods are normally positioned vertically in the skeleton. When pulling fuel rods from the magazine into the skeleton, it is convenient to position the magazine and the skeleton such that the fuel rods are horizontal. The skeleton can be clamped in position relative to the grasping apparatus, for example as disclosed in U.S. Pat. No. 4,760,637—Kerrey et al.

U.S. Pat. No. 4,894,848—Lambert et al discloses the use of a programmed processor for assisting in patterned loading of fuel rods into skeletons from a supply of fuel rods of different enrichments. The loader is disposed between the skeleton and a supply of fuel rods, and pushes rods one-by-one from the supply into the skeleton rather than reaching through the skeleton to engage and pull the rods back into the skeleton. The processor is coupled to means for selecting a particular bin in the supply, means for positioning the fuel assembly skeleton vertically and horizontally for selection of rod location, and data input means. The processor maintains a database of selectable enrichment patterns for skeletons and also maintains a database of codes defining the enrichment of the fuel rods stored in the supply bins, corresponding to bar code labels on the fuel rods. The supply bins, feeding apparatus and skeleton are all mounted parallel to a feed path defined by motorized pinch rollers. One of the fuel rods is advanced manually from the supply bin to a feed position where a bar code reader detects the bar code on the rod. The processor determines the enrichment of the rod from the bar code, and positions the fuel assembly skeleton to align one of the positions in the X-Y array of fuel rods to the feed path, as appropriate to the particular enrichment pattern selected. The fuel rod is then advanced into the skeleton until it clears the pinch rollers. A supplemental pushing apparatus completes the advance of the fuel rod into position.

The fuel rod positions in the skeleton assembly typically are geometrically regular, except spaces that are left for the control rod thimbles and instrumentation tubes. These positions are programmed in the programmed pattern such that the loader passes over them when installing the rods.

It is important to handle the fuel rods carefully while passing the rods through the springs engaging the rods at the grids. Obstructions which are encountered, particularly when pushing rods but also when pulling them inaccurately or at the wrong speed, can cock dimples in the grids or cause other loading damage. Loading damage may be difficult to detect, especially if the rods are loaded in a sequence in which rods loaded initially obstruct the operator's view of rods loaded later. Damage to the rods increases the possibility that the rods will fail, and perhaps release radioactive material into the primary reactor coolant.

SUMMARY OF THE INVENTION

It is an object of the invention to provide an automatic loading apparatus for loading a fuel assembly skeleton with fuel rods, including automatic pattern control and automatic positioning capability, and which is dependable, quick and convenient.

It is another object to automatically control aspects of loading in addition to fuel rod enrichment patterns, such as the operational parameters to be maintained, whereby only supervisory attention is required of the operator.

These and other objects are achieved in an automated fuel assembly loader capable of patterned loading, for moving nuclear fuel rods in a loading direction between a fuel rod skeleton defining an array of receptacles for the fuel rods, and a fuel rod magazine supplying or receiving the fuel rods. A chassis supports the fuel rod skeleton at a loading position. A movable carriage having a line of individual fuel rod engaging devices moves a subset of fuel rods along the line forward in the loading direction. The rods are selected via a pattern stored in a controller. Selection devices such as pneumatic clamps mechanically couple the selected engaging devices to the carriage for movement while others are left behind. A ball screw carriage drive arrangement moves the carriage parallel to the loading direction and a jack screw positioning drive displaces the carriage perpendicular to the line of fuel rods. A controller is coupled to the carriage drive and to the selection devices, and stores data defining a preset pattern of receptacles in the array, operating the selection devices for actuating a group of engaging devices corresponding to the pattern. The controller also controls displacement speed, permitting patterned loading of the skeleton, for example to obtain a particular pattern of fuel rod enrichments, the controller moving line by line through an array of fuel rod receptacles in the skeleton.

BRIEF DESCRIPTION OF THE DRAWINGS

The invention is disclosed with reference to certain exemplary embodiments as shown in the appended drawings. It should be understood that the invention is not limited to the exemplary embodiments and is subject to variation in accordance with the description and the appended claims. In the drawings.

DETAILED DESCRIPTION OF THE PREFERRED EMBODIMENTS

Figure 1:
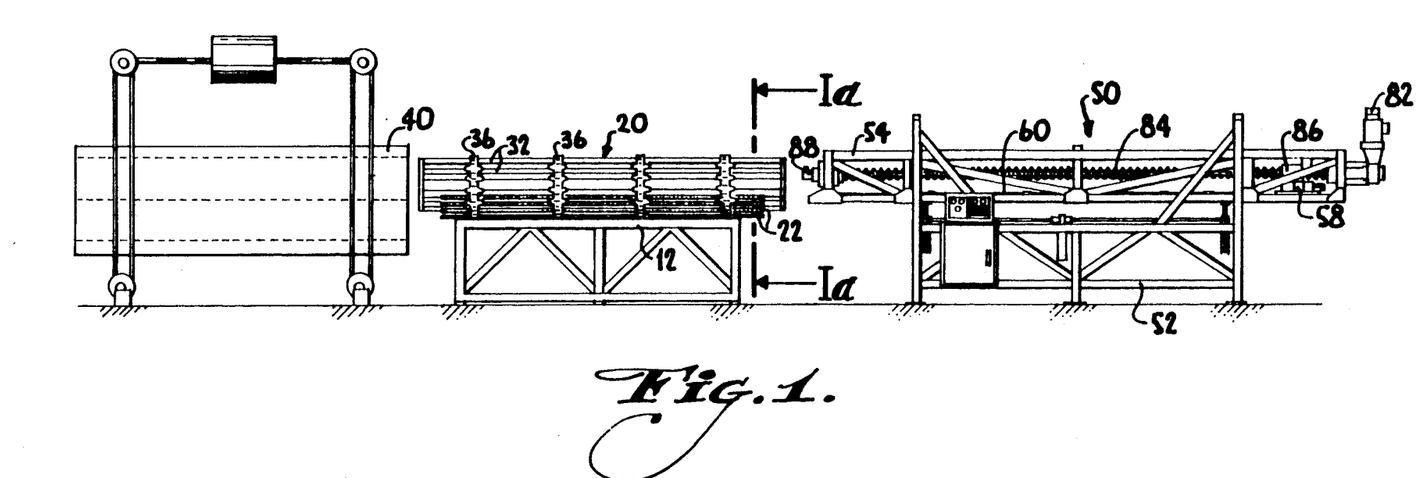
FIG. 1 is a schematic side elevation view of an automated fuel rod loading system according to the invention, with a loader operatively arranged relative to a fuel rod skeleton and a fuel rod magazine.

For pulling fuel rods into a fuel rod support skeleton 20, as shown generally in FIG. 1, the skeleton 20 is placed between a magazine 40 holding a supply of fuel rods and the loader 50 of the invention. A group of grasping rods 60 as explained more fully hereinafter are provided in loader 50 and can be positioned in line with receptacles defined by the skeleton 20 for receiving fuel rods 22. The fuel rod receptacles in the skeleton are interspersed with positions which do not require fuel rods, in particular, thimble tubes which are intended to provide receptacles for movable control rods for damping neutron flux during generation of power, rather than for fuel rods. The loader selectively advances certain of the grasping rods 60, passing over others, as it loads the required fuel rods 22 and leaves empty the position occupied by thimble tubes 32.

Pulling of the fuel rods from the magazine 40 into the skeleton 20 is the preferred technique for loading the skeleton, because pulling is less likely to damage the rods or the skeleton than pushing. It is also possible, however, to apply the invention to pushing selected rods into place in an array. In that situation, the magazine is of course placed between the loader and the skeleton.

Under control of a processor which stores in memory a pattern representing the respective positions of the receptacles in the skeleton which require fuel rods and the gaps to be left at thimble tubes, the loader engages a subset of the grasping rods with a movable carriage 58. The carriage 5 is advanced toward the skeleton to extend the selected grasping rods 60 through the skeleton 20 to the magazine 40. The advanced grasping rods contact the ends of the selected fuel rods 22 in the magazine 40. A mechanical movement driven by loader 50 engages the grasping rods with the ends of the fuel rods. The carriage 58 is then retracted, pulling the selected fuel rods back into place in the skeleton 20 via the grasping rods 60.

The loader 50 preferably has a line of grasping rods which are spaced to correspond to a row of fuel rod receptacles in the skeleton. After completing a row by pulling the needed group of fuel rods into place, the loader releases the grasping rods from the fuel rods and steps the line of grasping rods incrementally to the next row by raising or lowering the carriage table 54 which movably supports the carriage 58 and the grasping rods 60. The processor selects a subset of grasping rods appropriate to this next row, proceeding through the array of receptacles to complete loading of the skeleton.

The skeleton 20 is fixed temporarily in place at a predetermined height, as suggested in FIG. 1 by support table 12, and the grasping rods are raised incrementally after a line is loaded. It would also be possible to arrange the skeleton to be movable, provided the grasping rods can be aligned to the fuel rod receptacles by relative positioning of the skeleton, the supply of fuel rods in the magazine and the grasping rods 60 in a collinear relationship. In the example shown, the magazine 40 is movable in height, for providing a supply of fuel rods in line with the fuel rod receptacles in the skeleton. The magazine 40 can have a supply of fuel rods of different enrichments loaded in bins as suggested in FIG. 1 by dotted lines, and a positioning means is provided for selectively aligning the desired bin with the fuel rod receptacles in skeleton 20 which are to be loaded.

Figure 1A:
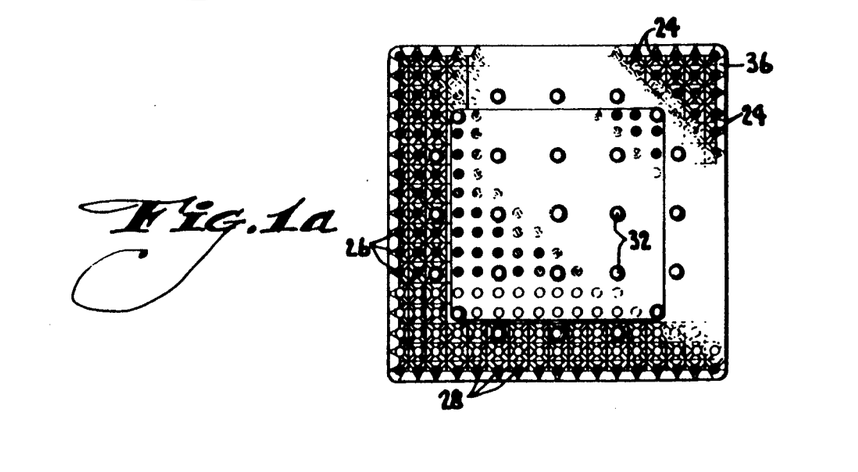
FIG. 1a is a transverse section view of skeleton 20 as loaded, showing the array of fuel rod receptacles and thimble tubes.

In FIG. 1, the skeleton 20 is shown partially loaded with fuel rods 22, and the grasping rods are retracted into the loader and aligned to a next empty row of fuel rod receptacles. The fuel rod receptacles 24 of skeleton 20 define an array of rows 26 and columns 28 as shown in FIG. 1a. In the embodiment shown, the loader 50 fills one horizontal row at a time, and then indexes vertically to fill the next row. The invention is also applicable to arrangements having other orientations. For example, the loader could readily be arranged to fill a vertical column and to index horizontally, or the overall orientation of the loading process could be set up such that the fuel rods are vertical or inclined, instead of elongated horizontally as shown. Accordingly, such terms as "vertical," "horizontal," "row" and "column" as used herein are meant to be exemplary rather than limiting.

The fuel rod skeleton 20 comprises a plurality of thimble tubes 32, extending parallel to the fuel rod receptacles, attached to grids 36, which are perpendicular thereto. The thimble tubes 32 and attached grids 36 form an integral support structure. For purposes of loading, the top and bottom nozzles can be removed to allow access to the fuel rod receptacles, or a nozzle structure can be provided with openings for access to the grid receptacles and thimble tubes.

Each of the receptacles is typically bounded by spring-like inward protrusions of the grids, which resiliently bear against the fuel rods 22, for keeping them in position. The loader 50 must overcome the friction exerted on the fuel rods by the grids, when pulling the fuel rods into position. The advance and retraction of the grasping rods by the loader is driven by a linear actuation means which drives carriage 58 toward or away from the skeleton 20. The linear actuation means comprises a carriage drive motor 82 for rotating a threaded carriage drive shaft 84 which is journalled at the opposite ends of the carriage table structure 54, namely adjacent the carriage drive motor 82 and at the opposite journal mount 88. A ball nut 86 is fixed to carriage 58 such that rotation of carriage drive shaft 84 by drive motor 82 moves carriage 58 toward or away from skeleton 20.

Figure 2:
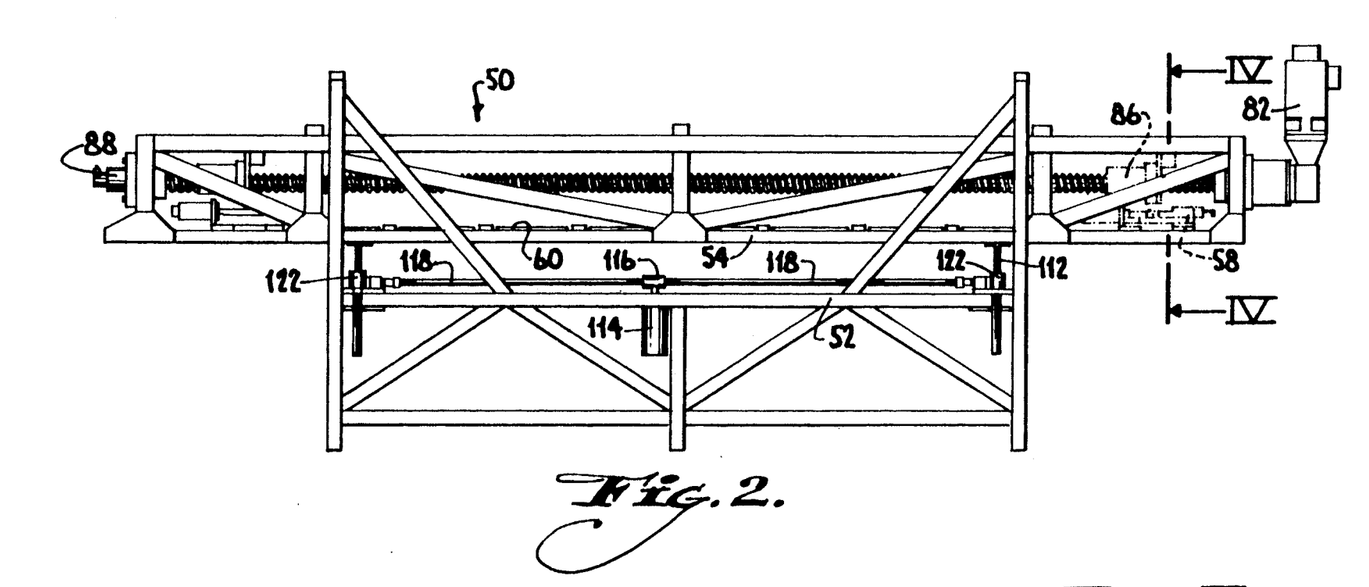
FIG. 2 is a side elevation view of the automated loader in a larger view.

FIG. 2 illustrates the loader 50 in more detail. Loader 50 comprises a stationary base or chassis 52, the vertically movable carriage table 54 and the horizontally movable carriage 58 thereon. The vertical indexing motion of the carriage table 54 is driven by vertical drive mechanism 112 comprising a vertical drive motor 114, a coupling 116 which drivably joins the shaft of motor 114 to a plurality of connecting rods 118, and a series of jackscrews 122, coupled to the connecting rods 118, for driving the carriage table 54 vertically relative to the fixed chassis 52.

Figure 3:
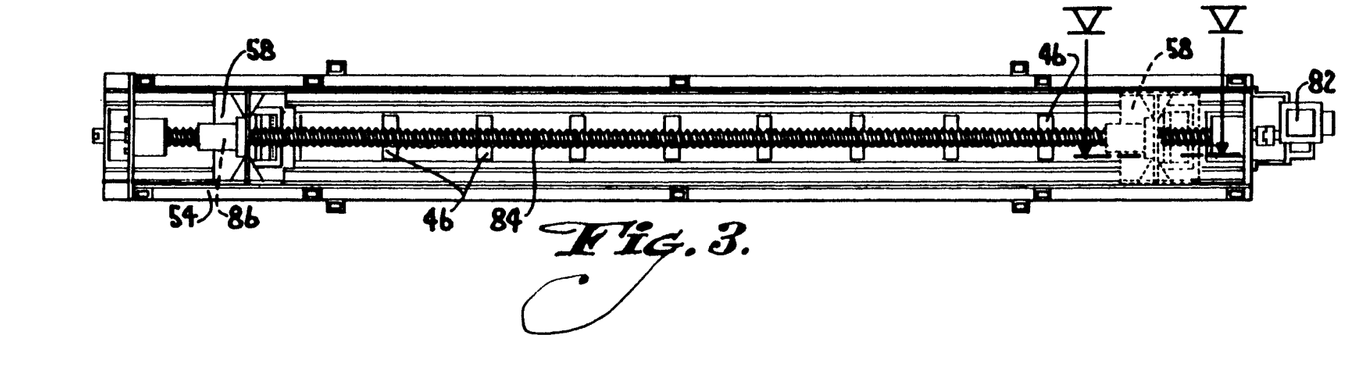
FIG. 3 is a top plan view of the automated loader according to FIG. 2.
Figure 4:
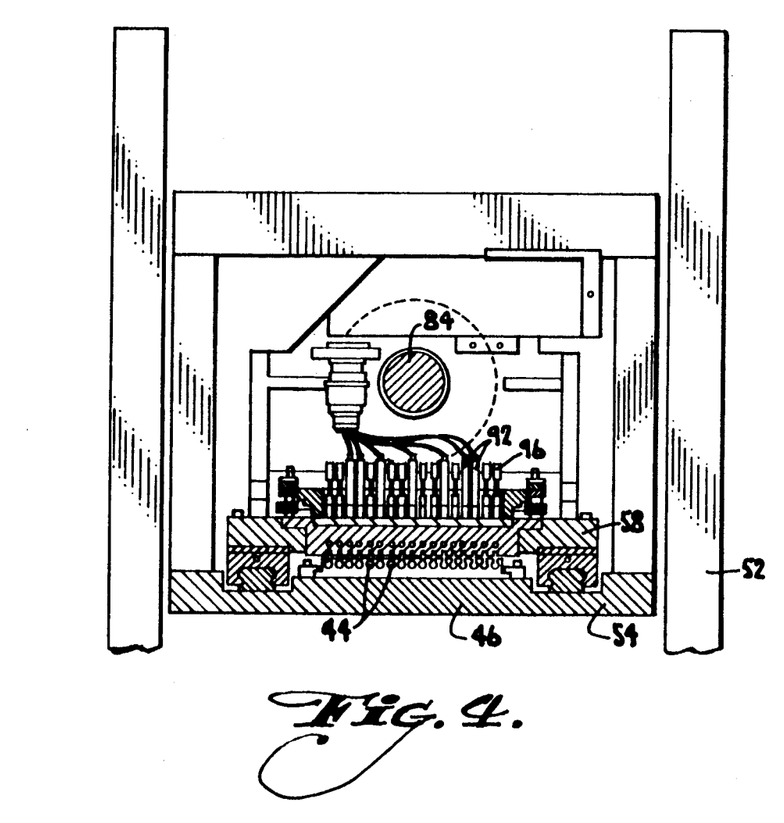
FIG. 4 is a detail view, partly in section, along line 4—4 in FIG. 2.

The carriage table 54 defines an elongated track along which carriage 58 is driven by the carriage drive mechanism, including carriage drive motor 82, carriage drive shaft 84 and ball screw 86. The carriage is preferably carried on the carriage table by suitable bearings which engage along rails disposed on the lateral sides of the table 54. FIG. 4, which is a cross section through the carriage table and the carriage, illustrates the support of carriage 58 on carriage table rails. FIGS. 2 and 3 illustrate the retracted position of the carriage in broken lines, and the advanced position of the carriage in solid lines. The selected grasping rods 60 protrude from the loader when the carriage is advanced toward journalled end 88.

FIG. 4 also illustrates the means for selectively enabling advance of the grasping rods 60 by selectively attaching certain of the grasping rods to the carriage 58. The grasping rods normally lie in laterally spaced relationship on carriage table 54, corresponding to the spacing of the fuel rod receptacles in skeleton 20. The carriage 58 includes selectively operable pneumatic clamps for each of the grasping rods, and thus can clamp individual grasping rods relative to the carriage for advancing the grasping rods with advance of the carriage. Grasping rods which are not clamped remain in place on the carriage table 54, and are passed over as the carriage advances.

Figures 7, 8, 9, 10:
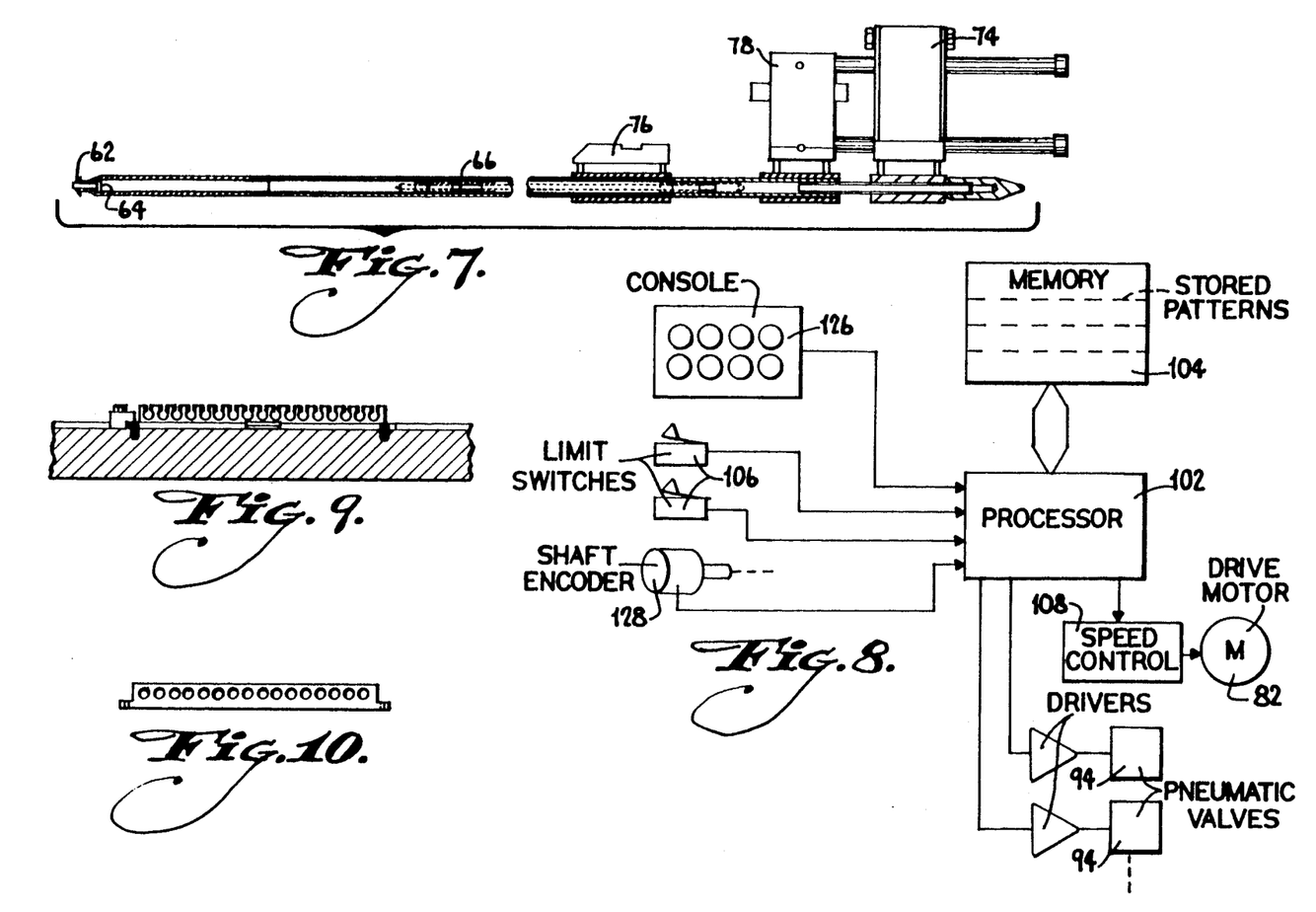
FIG. 7 is a longitudinal section view, broken in length, illustrating operation of the grasping means.
FIG. 8 is a schematic block diagram illustrating the electrical aspects of the invention.
FIG. 9 is an end elevation view illustrating one form of the replaceable grasping rod supports positioned on a cross member of the carriage table, the cross member being shown in section.
FIG. 10 is an end elevation comparable to FIG. 8, showing an alternative form of replaceable grasping rod support.

The grasping rods lie in guide slots 44 formed on lateral cross braces 46, spaced along carriage table 54. At least those cross braces 46 which are disposed along the path of carriage 58 have slots which are open facing upwardly as shown in FIG. 9, whereby clearance is available for passage of the clamping means which fixes selected grasping rods relative to the carriage. One or more braces disposed at the extreme end of the carriage table 54, beyond the maximum advance of the carriage, can have closed bores as shown in FIG. 10, for guiding the grasping rods in lieu of slots which open upwardly.

The clamping fixture of the carriage 58 and the cross braces 46 on the carriage table are readily replaceable. In this manner, the loader 50 can be quickly configured to load skeletons having a different spacing of fuel rod receptacles or a different number of fuel rods per row. Skeletons are produced, for example, in arrays of 14×14 through 17×17 receptacle positions (some of which are occupied by thimble tubes). Provided the receptacle spacing is the same for different configurations, it is also possible to load skeletons having fewer receptacles in a row (e.g., 14 positions) by simply not selecting the laterally outermost grasping rods from a larger number (e.g., 17) of available grasping rods.

Figure 5:
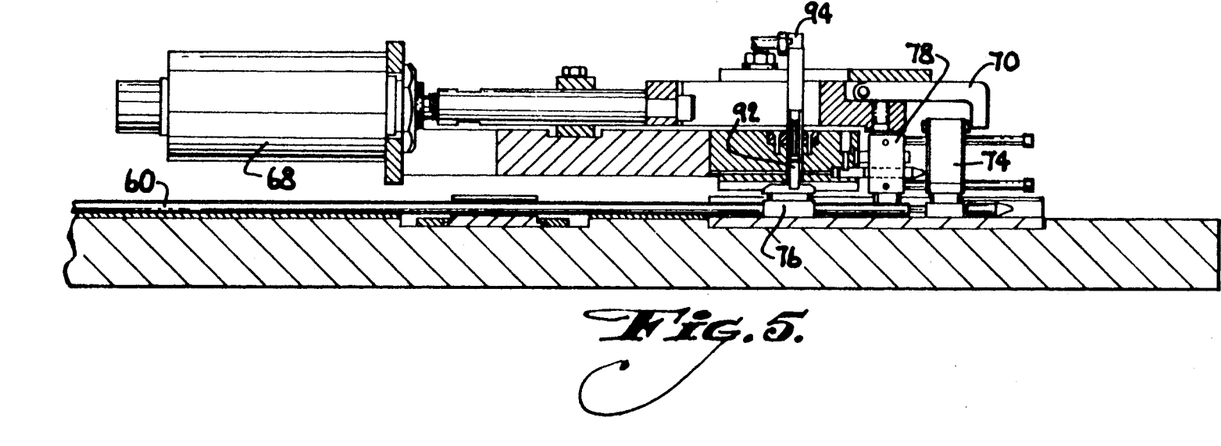
FIG. 5 is a longitudinal section view along line 5—5 in FIG. 2, illustrating the selection and grasping means for a selected fuel rod in a row.
Figure 6:
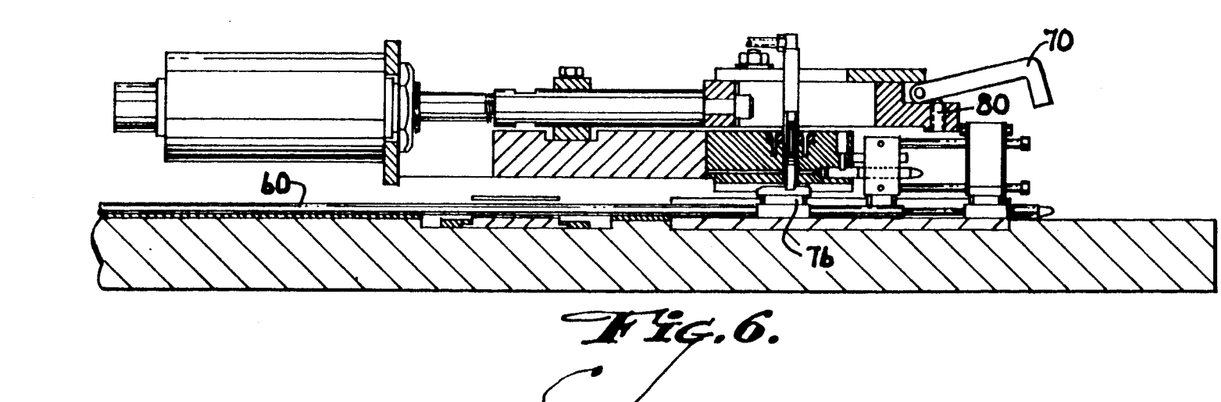
FIG. 6 is a section view corresponding to FIG. 5, but showing the relationship of the selection and grasping means for a fuel rod position which is not selected.

FIGS. 4–6 illustrate a preferred embodiment of the clamping mechanism which enables selection of a subset of the grasping rods during each advance of the carriage. The clamping mechanism comprises a plurality of shear pins 92, 96 which are fixed relative to the carriage and can be dropped into mating receptacles in the grasping rods for selecting them. Shear pins 92 can be driven pneumatically into engagement with the grasping rods, using solenoid valves 94 coupled to a supply of pressurized air and operated by the controller. The valves can be arranged to drive the shear pins 92 either up or down, or alternatively the shear pins can be spring biased in one direction and pneumatically driven in the other. Other means for driving the shear pins are also possible, for example the shear pins can be electrically driven directly by solenoids.

As shown in FIG. 1a, the thimble tubes 32 may occur in certain columns only. Accordingly, when loading a skeleton of this type, certain of the grasping rods are needed for loading every row, while those occupying columns which have thimble tubes are skipped for some of the rows. The grasping rods which will not encounter thimble tube positions need not be selectable, and it is possible to provide clamping mechanisms for these rods which are fixed manually. As shown in FIG. 4, the manually fixed clamps can have shear pins 96 which are manually raised and lowered. Pins 96 can be set in the raised position or allowed to drop into the mating receptacle in the associated grasping rod by a twist-lock arrangement or the like.

FIGS. 5-7 illustrate operation of the grasping rods 60, with FIGS. 5 and 6 showing primarily the end of the grasping rods engaging the carriage 58 and FIG. 7 showing the entire grasping rod in a length-reduced manner. As shown in FIG. 7, the grasping rod comprises a hollow tube having a contoured distal end 62 which tapers internally, and is shaped externally to fit into a complementary opening formed in a plug disposed in the end of a fuel rod. The contoured end 62 is axially slotted and therefore expandable. A movable plug 64 is disposed in the tube at the distal end of a drive shaft 66. The proximal end of the drive shaft is driven to advance or retract plug 64 axially in the tapering distal end of the tube, respectively to engage a fuel rod by resiliently expanding end 62, and to release the fuel rod by allowing end 62 to return to its tapering shape at rest.

Referring to FIG. 7, each of the grasping rods comprises a slotted block 76 which is fixed to the tube and arranged to receive a selection shear pin 92 or 96 from the carriage, a movable block 74 which is fixed to the plug drive shaft for positioning the plug in the tube, and an end block 78 which is also fixed to the tube and carries two slide guides on which the movable block is supported. The carriage includes a pneumatically operable driver 68 which forces the movable block 74 toward or away from the slotted block 76, by operation of the controller.

The driver mechanism 68 is arranged such that it can pass over any grasping rod which is not selected by the controller. Accordingly, the driver 68 includes a pivotable flange part 70 for each of the grasping rods, the flange parts for the respective grasping rods being carried on a slide block associated with the carriage. The flange part 70 engages over the rear or proximal end of the movable block 74 fixed to the drive shaft 66 for forcing the plug into the forward position as shown in FIG. 5. When the slide block moves the pivotable flange part rearwardly relative to the carriage, the flange part pivots upwardly under pressure of a spring 80 as shown in FIG. 6, allowing the carriage to pass over the non-selected grasping rods.

The pivotable flange part 70 for each grasping rod which is not selected must be raised (as in FIG. 6) when the carriage 58 is advanced from its retracted position in order to clear the grasping rods 60 which are not selected and leave them behind as the carriage 58 advances. However, inasmuch as the movable block which the flange part engages protrudes upwardly at the rear of the grasping rod for only a short axial distance, it is not necessary that the grasping device be operated only after the carriage has advanced clear beyond the distal end of the grasping rods. The grasping device can be operated when the carriage is advanced enough to place the flange part 70 axially forward of the movable block 74 for the grasping rods 60 which are not selected. This enables displacement of the carriage 58 to pull fuel rods of a shorter or longer length.

The respective movable parts of the loader are operated according to a programmed sequence stored in the memory of a controller 102, shown in FIG. 8, for effecting loading of fuel rods in a predetermined stored pattern. Operation of the controller 102 involves a series of steps which are initiated by an operator and continued by the controller based a program stored in memory 104 and upon inputs from switching means 106. The controller can be a programmable logic controller (PLC) or other processor having outputs coupled to drivers for operating the various pneumatic solenoid valves of the selection and grasping mechanisms, and also preferably provides outputs for varying the speed of the motors used to operate the positioning devices, via one or more speed controls 108. Inputs to the processor are provided from an operator console 126 and from limit switches placed at various positions along the path of the carriage 58. The limit switches detect, for example, the horizontal home (retracted) and extended (advanced) positions of the carriage, vertical home and maximum vertical positions of the carriage table, and the like. An intermediate position of the carriage along its path of advance or retraction can be sensed using a limit switch, to trigger a change in speed when the fuel rods approach the skeleton. In this manner, the carriage can be moved about rapidly to place the grasping apparatus in engagement with the fuel rods, and more slowly when the fuel rods come into contact with the receptacles of the skeleton. By slowing operation during pulling of the fuel rods through the grids, the potential for damage to the fuel rods is minimized.

A job change from one loading one skeleton configuration to another is accomplished by selecting a different stored program for the PLC, which preferably has a plurality of stored patterns and is also programmable to add patterns or to alter those already stored. As noted above, it may also be necessary to change the cross braces guide members 76, 78 and the carriage grasping rod selection mechanism carrying shear pins 92, 96 if the lateral spacing of the rods is different. Based on the stored program, the PLC operates the electric servo motor 114 driving the four jackscrews 122 for vertically positioning the carriage table, and automatically sets the grasping rod selection means including pins 92, 96 and flange part 70, to fix the necessary grasping rods to the carriage for a given row in the skeleton, omitting those grasping rods which are aligned in that row with thimble tubes 32. The controller advances the carriage by controlling the carriage drive motor 82, engages the selected fuel rods by operation of the grasping rod plugs 64 (i.e. by operating driver 68), and reverses the carriage drive motor 82 to pull the fuel rods 22 through the skeleton. By sensing the home position of the carriage 58 and rotation of the carriage drive shaft 84, for example using an input from a shaft angle encoder 128 coupled to the carriage drive shaft, the present position of the carriage can be calculated. The operation of the carriage drive motor 82, including the speeds and acceleration or deceleration of the carriage, can thus be programmed in the PLC, to enable changes in speed as appropriate for a particular skeleton structure. For example, the axial positions of each grid in the skeleton can be programmed into the PLC as a part of the stored program for that skeleton. The carriage can then be decelerated as the fuel rods approach a grid, and the leading edge eased through the grid before the speed is increased again.

The invention provides a versatile and efficient means for loading fuel rod skeletons in a manner requiring a minimum of operator interaction. It is also readily possible to job change quickly from one skeleton loading procedure to another, with the aspects of the new job either preprogrammed or readily entered into the PLC program memory by console inputs from the operator.

The invention having been disclosed in connection with a preferred exemplary embodiment, variations within the scope of the invention will now be apparent to persons skilled in the art. Reference should be made to the appended claims rather than the foregoing discussion of preferred examples, in order to assess the scope of exclusive rights in the invention claimed.

We claim:

1. A fuel assembly loading apparatus for moving fuel rods in at least one loading between a fuel rod skeleton defining an array of for the fuel rods, and a fuel rod magazine for the fuel rods, the apparatus comprising:
   a chassis having means for supporting the fuel rod skeleton at a loading position;
   a carriage having a plurality of individual fuel rod engaging devices for moving the fuel rods in said loading direction;
   a plurality of selection devices coupled to the engaging devices, said selection devices being operable selectably to actuate at least a subset of the fuel rod engaging devices, such that when actuated the subset of the engaging devices are coupled for movement in the loading direction whereby selected ones of the fuel rods are displaced;
   powered means operable to move the subset of fuel rod engaging devices in the loading direction; and,
   a controller coupled to the powered means and to at least some of the selection devices, the controller being operable to store data defining preset pattern of receptacles in the array, to operate the selection devices for actuating a group of said engaging devices corresponding to the pattern, and to operate the powered means for moving fuel rods in the preset pattern in the loading direction.

2. The fuel assembly loading apparatus according to claim 1, wherein the controller is operable to store a plurality of alternative preset patterns, and further comprising an input means coupled to the controller and operable to permit manual selection of one of the alternative preset patterns.

3. The fuel assembly loading apparatus according to claim 2, wherein the powered means comprises an actuator operable for advancing the carriage in the loading direction, and wherein the selection devices are operable to fix said subset of engaging devices relative to the carriage while releasing others of the engaging devices relative to the carriage.

4. The fuel assembly loading apparatus according to claim 1, wherein the engaging devices substantially define a linear array and the receptacles define a two dimensional array, and further comprising powered means coupled to the controller, operable to displace one of said engaging devices and said skeleton relative to the other, along a line substantially perpendicular to the linear array, the preset pattern being two dimensional.

5. The fuel assembly loading apparatus according to claim 4, wherein the carriage is movable to advance the subset of engaging devices through the skeleton to the magazine, and to retract the subset of engaging devices through the skeleton, the engaging devices each comprising a controllable grasping apparatus operable to engage an end of a corresponding fuel rod in the magazine.

6. The fuel assembly loading apparatus according to claim 5, wherein the controllable grasping apparatus includes a tube having an expandable end, and an expansion plug which is advanced in said expandable end for grasping internally an opening defined in an end of the fuel rods.

7. The fuel assembly loading apparatus according to claim 1, wherein the means for engaging the fuel rods includes a plurality of grasping apparatus coupled to the controller, for selective engagement of particular ones of the grasping apparatus in a pattern stored by the controller.

8. The fuel assembly loading apparatus according to claim 1, wherein the controller is programmable for selection of alternative parameters for displacement of the rods, including at least one of displacement speed and displacement endpoints.

9. The fuel assembly loading apparatus according to claim 7, wherein the receptacles are disposed in a regular pattern, wherein the means for engaging the fuel rods includes at least a line of said grasping apparatus elongated in one of height and width relative to the pattern, and wherein the powered means is operable by the controller to index the carriage perpendicular to the line of grasping apparatus while operating selected ones of the grasping apparatus.

10. The fuel assembly loading apparatus according to claim 9, wherein the chassis comprises a horizontal support table having a vertical adjustment means operable under control of the controller, the vertical adjustment means comprising a plurality of motor driven jack screws operable to displace the carriage relative to the horizontal support table.

11. The fuel assembly loading apparatus according to claim 10, wherein the powered means comprises a motor which is mechanically coupled to a plurality of said jack screws for displacing the carriage relative to the horizontal support table.

12. The fuel assembly loading apparatus according to claim 11, wherein the powered means operable to move the carriage comprises a motor driven ball screw arrangement coupled to the controller for displacing the carriage parallel to a line of elongation of the fuel rods.

13. The fuel assembly loading apparatus according to claim 3, wherein the selection devices include electromechanically operable clamps coupled to the controller for selectively fixing the engaging devices to the carriage.

14. The fuel assembly loading apparatus according to claim 13, wherein the engaging devices include elongated tubes and the selection devices include a plurality of solenoid clamps which are advanced laterally against the tubes to lock selected ones of the tubes to the carriage.

15. The fuel assembly loading apparatus according to claim 14, wherein the selection devices include at least one manually operable clamp for locking at least one tube to the chassis.

16. The fuel assembly loading apparatus according to claim 14, wherein the engaging devices include tubes having an expandable end, each of the tubes having a movable expansion plug which is advanced in said expandable end for grasping internally an opening defined in an end of the fuel rods, expansion plugs for each of the tubes being advanced together by the powered means.

17. The fuel assembly loading apparatus according to claim 16, wherein the expansion plugs are each attached to a drive shaft extending through a respective said tube, the powered means including means for engaging the drive shafts of a plurality of said tubes for advancing corresponding ones of the engaging devices.

* * * * *